Patented Feb. 9, 1943

2,310,616

UNITED STATES PATENT OFFICE 2,310,616

SEPARATION OF METACRESOL AND PARACRESOL

Francis E. Cislak and Merritt M. Otto, Indianapolis, Ind., assignors to Reilly Tar & Chemical Corporation, Indianapolis, Ind., a corporation of Indiana No Drawing. Application August 11, 1941, Serial No. 406,410

6 Claims. (Cl. 260—621)

Our invention relates to the separation of metacresol and of paracresol from mixtures containing both metacresol and paracresol.

It is the object of our invention to obtain the individual metacresol and the individual paracresol from such a mixture.

A mixture of metacresol and paracresol, associated with various other phenolic bodies, is obtained in the processing of coal tar. These other phenolic bodies, including orthocresol, can be separated quite readily and fairly completely from the mixture of metacresol and paracresol, by fractional distillation; but the boiling points of the metacresol and of the paracresol are so close together that it is not commercially practical to separate them by fractional distillation.

We have found that by treating with hexamethylenetetramine a mixture of metacresol and paracresol, usually containing small amounts of higher and lower related phenolic bodies (such as orthocresol and the xylenols), we get a mixed product of metacresol-hexamethylenetetramine and paracresol-hexamethylenetetramine; that metacresol-hexamethylenetetramine and paracresol-hexamethylenetetramine are quite different in their solubilities in various solvents; and that by reason of these differences in solubility we can separate the metacresol-hexamethylenetetramine and the paracresol-hexamethylenetetramine from each other and obtain either in quite pure form; which individual addition products, metacresol-hexamethylenetetramine and paracresol-hexamethylenetetramine, may readily be reconverted into metacresol and paracresol respectively by decomposition.

Metacresol-hexamethylenetetramine and paracresol-hexamethylenetetramine have these differential solubilities in many solvents—including the hydrocarbons generally, such as benzene, toluene, and xylene, alcohols, such as ethanol, propanol, and butanol, nitroethane, and 1-nitropropane—and any such solvent can be used to separate the two compounds. So our invention is not limited to any particular solvent or solvents, but is directed broadly to the conversion of mixed metacresol and paracresol, to a mixture of addition products thereof with hexamethyleneteramine, to the separation of a component of the latter mixture by differential solubility, and the reconversion of the separated component to the original cresol.

The individual addition products of pure metacresol and of pure paracresol with hexamethylenetetramine, to form crystalline compounds, are already known, for they were prepared by Baekeland about twenty years ago (J. I. & E. Chem. 13, 136 (1921)); who also showed that they were reconvertible into the original cresols by decomposition with ether. But the differential solubilities of these addition products, and the capability of using that differential solubility to separate mixtures of the two addition products, is new with us.

The following examples illustrate our invention:

*Example 1.*—Sixty pounds of a commercial mixture of metacresol and paracresol, which mixture usually contains about 55–60% metacresol, is heated for about a half-hour to an hour with 28–30 pounds of hexamethylenetetramine, conveniently at about 60–80° C. With these proportions there is an excess of cresol, which we deem desirable. During the heating the hexamethylenetetramine forms addition products with both the metacresol and the paracresol present in the mixture, but leaves some of both metacresol and paracresol unreacted. After the heating for about an hour, 15–18 pounds of 95% ethyl alcohol is added, with stirring, and the mixture is then cooled to about 15° C. Crystals of metacresol-hexamethylenetetramine form on such cooling; but with these concentrations the ethyl alcohol retains in solution most of the paracresol-hexamethylenetetramine and some metacresol-hexamethylenetetramine, and the excess unreacted cresol.

The crystals of metacresol-hexamethylenetetramine are suitably separated from the solution, as by filtering or centrifuging; and are washed with ethyl alcohol to remove traces of adherent mother liquor. These crystals are ordinarily sufficiently pure so that they need no recrystallization; but if desired they can be further purified by recrystallization from a suitable solvent, such as ethyl alcohol, butyl alcohol, benzene, toluene, 1-nitropropane, or nitroethane. The crystals of metacresol-hexamethylenetetramine may be decomposed by treatment with ether, dioxane, isopropyl acetate, or acetone, to produce hexamethylenetetramine and metacresol. Upon such treatment the freed hexamethylenetetramine separates as a solid, and is suitably removed, as by filtration; while the freed metacresol remains dissolved in the ether or the dioxane or the isopropyl acetate or the acetone, from which it is readily recovered by extraction or distillation. As so recovered it is usually about 95–98% metacresol.

*Example 2.*—Six hundred pounds of a commercial mixture of metacresol and paracresol, usually containing about 55–60% metacresol, is heated for about half an hour to an hour with about 280–300 pounds of hexamethylenetetramine, conveniently at about 60–80° C. This forms addition products, as in Example 1. After the heating, about 250–300 pounds of a low-boiling petroleum naphtha (boiling at about 100°–175° C.) is added, with stirring, and the mixture is cooled to about 15°–20° C. The crystals obtained under these conditions are a mixture of metacresol-hexamethylenetetramine and paracresol-hexamethylenetetramine, as distinguished from the substantially pure metacresol-hexamethylenetetramine obtained at a corresponding point in Example 1. These mixed crystals are suitably separated from the solution, as by filtering or centrifuging, and are washed with petroleum naphtha to free them from adhering mother liquor. The washed crystals are taken up in about a one-third part to a one-half part of heated butanol or propanol, and the solution is cooled conveniently to about 15 to 20° C.; whereupon crystals of substantially pure metacresol - hexamethylenetetramine separate out. The metacresol is recovered from these crystals as in Example 1.

Example 3.—By Examples 1 and 2 we obtain metacresol of high purity. By our invention we can also obtain a paracresol of high purity. Because of the solubility relationships, in order to prepare a paracresol of high purity it is necessary first to obtain a metacresol-paracresol mixture in which the paracresol predominates. Such a mixture can be obtained from the filtrate of either of Examples 1 and 2, by decomposition of the addition products in those mixtures, or as a by-product in other commercial operations.

Six hundred and forty eight pounds of such a mixture of metacresol and paracresol, containing about 40–45% metacresol, is heated for about a half-hour to an hour with about 300 pounds of hexamethylenetetramine conveniently at about 60–80° C. After that heating, 100 pounds of 95% ethyl alcohol is added, with stirring, and the mixture is cooled to about 15° C. Crystals separate, and are removed by filtering or centrifuging; and are recrystallized from benzene several times—desirably three or more times. The crystals obtained after such recrystallization are fairly pure paracresol-hexamethylenetetramine; from which the paracresol is liberated in the same manner as was the metacresol in Example 1, as by treatment with ether, dioxane, isopropyl acetate, or acetone. In this way, we obtain a paracresol of about 90–95% purity.

We claim as our invention:

1. The process of separating an individual cresol of the class consisting of metacresol and paracresol from a phenolic mixture consisting mainly of those two cresols, which consists in reacting such mixture with hexamethylenetetramine to produce a mixture of metacresol-hexamethylenetetramine and paracresol-hexamethylenetetramine, separating the latter mixture by a solvent in which those two addition compounds are differentially soluble to obtain a product rich in the hexamethylenetetramine addition compound with one of the said two cresols, and decomposing said product to recover a purified cresol.

2. The process of separating an individual cresol of the class consisting of metacresol and paracresol from a phenolic mixture consisting mainly of those two cresols, which consists in reacting such mixture with hexamethylenetetramine, with the cresols in excess, to produce a mixture of metacresol-hexamethylenetetramine and paracresol-hexamethylenetetramine and unreacted cresols, separating the latter mixture by a solvent in which those two addition compounds are differentially soluble to obtain a product rich in the hexamethylenetetramine addition compound with one of the said two cresols, and decomposing said product to recover a purified cresol.

3. The process of separating pure metacresol from a phenolic mixture consisting mainly of metacresol and paracresol with the metacresol predominating, which consists in treating such mixture with hexamethylenetetramine to produce a mixture of metacresol-hexamethylenetetramine and paracresol-hexamethylenetetramine, separating the latter mixture by a solvent in which those two addition compounds are differentially soluble to obtain a purified metacresol-hexamethylenetetramine, and decomposing said purified metacresol-hexamethylenetetramine to recover metacresol therefrom.

4. The process of separating pure metacresol from a phenolic mixture consisting mainly of metacresol and paracresol with the metacresol predominating, which consists in treating such mixture with hexamethylenetetramine, with the cresols in excess, to produce a mixture of metacresol-hexamethylenetetramine and paracresol-hexamethylenetetramine and unreacted cresols, separating the latter mixture by a solvent in which those two addition compounds are differentially soluble to obtain a purified metacresol-hexamethylenetetramine, and decomposing said purified metacresol-hexamethylenetetramine to recover metacresol therefrom.

5. The process of separating pure paracresol from a phenolic mixture consisting mainly of metacresol and paracresol with the paracresol predominating, which consists in treating such mixture with hexamethylenetetramine to produce a mixture of metacresol-hexamethylenetetramine and paracresol-hexamethylenetetramine, separating the latter mixture by a solvent in which those two addition compounds are differentially soluble to obtain a purifier paracresol-hexamethylenetetramine, and decomposing said purified paracresol-hexamethylenetetramine to recover paracresol therefrom.

6. The process of separating pure paracresol from a phenolic mixture consisting mainly of metacresol and paracresol with the paracresol predominating, which consists in treating such mixture with hexamethylenetetramine, with the cresols in excess, to produce a mixture of metacresol-hexamethylenetetramine and paracresol-hexamethylenetetramine and unreacted cresols, separating the latter mixture by a solvent in which those two addition compounds are differentially soluble to obtain a purified paracresol-hexamethylenetetramine, and decomposing said purified paracresol-hexamethylenetetramine to recover paracresol therefrom.

FRANCIS E. CISLAK.
MERRITT M. OTTO.